United States Patent [19]

Winkler et al.

[11] Patent Number: 4,830,707
[45] Date of Patent: May 16, 1989

[54] METHOD AND APPARATUS FOR PREPARING HIGH-CONCENTRATION ALKALI

[75] Inventors: Robert Winkler, Wallisellen, Switzerland; Siro Sala, Como, Italy; Yakayuki Kobayashi; Shinjiro Yokota, both of Ube, Japan

[73] Assignees: Sulzer-Escher Wyss AG, Zürich, Switzerland; Ube Industries, Ltd., Ube, Japan

[21] Appl. No.: 879,105

[22] PCT Filed: Apr. 18, 1985

[86] PCT No.: PCT/EP85/00175
 § 371 Date: May 27, 1986
 § 102(e) Date: May 27, 1986

[87] PCT Pub. No.: WO86/00876
 PCT Pub. Date: Feb. 13, 1986

[51] Int. Cl.$^4$ .......................... B01D 1/00; B01D 3/06
[52] U.S. Cl. ........................ 159/47.1; 159/2.1;
  159/901; 159/DIG. 34; 203/12; 203/88; 203/91
[58] Field of Search ...................... 203/12, 22, 88, 91,
  203/DIG. 8; 159/2.1, 47.1, 901, DIG. 34, DIG. 42; 423/641

[56] References Cited

U.S. PATENT DOCUMENTS

| | | | |
|---|---|---|---|
| 1,883,211 | 10/1932 | Wilson | 159/DIG. 34 |
| 2,562,495 | 7/1951 | Hulme | 159/2.1 |
| 3,232,846 | 2/1966 | Kimmerle | 203/DIG. 1 |
| 3,330,740 | 7/1967 | Duffy | 203/DIG. 1 |
| 3,467,162 | 9/1969 | Putnam | 159/2.1 |
| 3,522,150 | 7/1970 | Galuska | 203/88 |
| 3,616,270 | 10/1971 | Ferrara | 203/88 |
| 3,630,262 | 12/1971 | Macek | 157/2.1 |
| 3,833,480 | 9/1974 | Bidard | 203/88 |
| 3,963,424 | 6/1976 | Bella, Jr. | 159/DIG. 34 |
| 4,132,588 | 1/1979 | Ogawa | 159/17.1 |
| 4,267,015 | 5/1981 | Ciboit et al. | 159/47.1 |

Primary Examiner—David L. Lacey
Assistant Examiner—V. Manoharan
Attorney, Agent, or Firm—Werner W. Kleeman

[57] ABSTRACT

A caustic alkali solution is concentrated to high density or high caustic alkali concentration by evaporation under high pressure at elevated temperature and expansion of the thus obtained concentrated caustic alkali solution to low pressure, preferably below atmospheric pressure. The pressure difference between the high pressure evaporator and the low pressure expansion vessel is absorbed gradually by a pressure difference absorber, preferably comprising a liquid column in a U-shaped siphon tube, so that corrosion and erosion are reduced considerably.

5 Claims, 3 Drawing Sheets

METHOD AND APPARATUS FOR PREPARING HIGH-CONCENTRATION ALKALI

BACKGROUND OF THE INVENTION

The present invention relates to a new and improved method as well as to a new and improved construction of an apparatus for producing high density or concentration alkali such as caustic soda (NaOH) and caustic potash (KOH) by evaporating a caustic alkali solution at elevated temperatures. The term "high-density or concentration alkali" within the context of the present disclosure is understood to relate to concentrations greater than, for example, 98% NaOH or 94% KOH, as the case may be.

A typical prior art apparatus used for producing high density or concentration caustic soda is shown in FIG. 1.

In this figure, reference numerals 1 and 2 denote evaporators, reference numerals 3 and 4 denote heat exchangers constituted by a multiplicity of tubes or pipes connected to the bottom section of the respective evaporators 1 and 2, reference numberal 5 denotes a heat transfer medium heater, reference numeral 6 denotes a flaker, and refernece numeral 7 denotes a condenser.

In this apparatus, a caustic soda solution having a density corresponding to a caustic soda concentration of 50% and having a temperature of 80° C. is infed through a pipe 8 into the tubes or pipes of the heat exchanger 3 connected to the bottom section of evaporator 1. The caustic soda solution is heated to 98° to 99° C. within the heat exchanger 3 by means of a 100° C. heat source which is formed by a vapor or steam introduced into the heat exchanger 3 through a pipe 9 from the upper end of the evaporator 2. Heating reduces the water content so that the caustic soda solution is now concentrated to a density corresponding to a caustic soda concentration of about 60%.

Reference numeral 10 denotes a discharge pipe through which the condensate is discharged after heat exchange from the heat exchanger 3.

The 60% caustic soda solution which accumulates in the bottom section of the evaporator 1, is transferred to the evaporator 2 through a pipe 11 leading from the bottom section of the evaporator 1 and to the tubes or pipes of the heat exchanger 4 connected to the bottom section of the evaporator 2. The caustic soda solution is heated in the heat exchanger 4 by molten salt which is supplied thereto from the heat transfer medium heater 5 through a pipe 12 and passed through the heat exchanger 4. As a result, there is obtained a 98.5% caustic soda solution at a temperature of about 400° C. Reference numeral 13 denotes a pipe through which the molten salt is discharged after the heat exchange in the heat exchanger 4.

The vapor or steam withdrawn at the upper end of the evaporator 1 is cooled by the condenser 7 and the condensate is discharged through a pipe 14. Any non-condensable gas is withdrawn through a pipe 15 and thereafter through a pipe 17 under the action of a steam ejector 16. Reference numeral 18 denotes a pipe for supplying steam and reference numerals 19 and 20 respectively denote pipes for supplying and discharging water.

The caustic soda solution having a density corresponding to a caustic soda concentration of 98.5% is collected in the bottom section of the evaporator 2 and is infed into the flaker 6 through a pipe 21 leading from the bottom section of the evaporator 2. The flaker 6 contains a rotary drum 6a and water is supplied to its inside so as to cool the caustic soda solution to flakes 22 of high density or concentration caustic soda.

In this prior art arrangement the flaker 6 is at atmospheric pressure and therefore it is difficult to maintain a higher pressure in the evaporator 2. Therefore the internal pressure in the evaporator 2 of the conventional apparatus must be maintained at atmospheric pressure. However, if higher pressure would be tried to be maintained inside the evaporator 2, it would be necessary to provide suitable pressure-reducing means in the pipe 21 in order to thereby prevent such higher internal pressure which would prevail in the evaporator 2, from being relieved into the flaker 6. Such pressure-reducing means might be constituted by a valve, an orifice or a restriction. Unfortunately, however, no material is available which is sufficiently corrosion resistant for effecting restriction of the flow of high density caustic soda at high temperature. The best material now available is pure nickel but even this quickly corrodes and is eroded and soon becomes unusable when exposed to a suddenly expanding mixture of vapor or steam and high density caustic soda at high temperature. Therefore, the internal pressure of the evaporator 2 which is directly connected to the flaker 6 through the pipe 21, usually is maintained at atmospheric pressure in the prior art.

In order to attain a 99% caustic soda solution in the evaporator 2, the molten salt is supplied as the heat source or heat transfer medium to the heat exchanger 4 and heats the interior of the evaporator 2 to 400° C. As a consequence, steam of 400° C. is infed into the pipe 9. Due to the high energy of this steam, such steam, if directly supplied to the heat exchanger 3, would concentrate the 50% caustic soda solution of about 80° C. as supplied through the pipe 8, up to about 65%, provided that adequate vapor pressure is achieved. In this conventional arrangement, however, the vapor or steam can only be used as a heat source of the relatively low saturation temperature of about 100° C. so that the evaporator 1 produces a caustic soda solution of about 60% only. If all the vapor or steam from the evaporator 2 would be introduced into the heat exchanger 3, the internal pressure in the evaporator 2 would rise and the excess pressure would be undesirably relieved into the flaker 6.

For these reasons, in the conventional apparatus shown in FIG. 1, not all the vapor or steam fed from the evaporator 2 into the pipe 9 is introduced into the heat exchanger 3, but some of the vapor or steam is discharged into the atmosphere through an intermediate section of the pipe 9 which results in a highly undesirable waste of energy.

SUMMARY OF THE INVENTION

Therefore with the foregoing in mind it is a primary object of the present invention to provide a new and improved method of producing high density caustic alkali and which method does not exhibit the aforementioned drawbacks and shortcomings of the prior art heretofore discussed.

Another and more specific object of the present invention is directed to providing a new and improved method of producing high density caustic alkali and which method permits an economically more favorable operation and a more favorable utilization of the available process energy.

A further significant object of the present invention is directed to a new and improved method of, and apparatus for, producing high density caustic alkali and which method and apparatus enable using a high pressure evaporating stage in the absence of any corrosion-susceptible pressure reducing means.

Now in order to implement these and still further objects of the invention, which will become more readily apparent as the description proceeds, the method of the present development is manifested by the features that, the caustic alkali solution is concentrated by evaporation under high pressure at a predetermined elevated temperature. The high pressure, then, is relieved from the thus obtained concentrated caustic alkali solution by means of pressure difference absorbing means which gradually absorb the pressure difference between the high pressure prevailing during the evaporating operation and the low pressure after the pressure relieving operation.

As alluded to above, the invention is not only concerned with the aforementioned method aspects, but also relates to a novel construction of an apparatus for producing high density or concentration caustic alkali.

In order to achieve the aforementioned measures, the inventive apparatus, in its more specific aspects, comprises:

a high pressure evaporation vessel operated at a predetermined elevated temperature and under a predetermined pressure above atmospheric pressure;

a low pressure expansion vessel operated under a predetermined pressure not exceeding atmospheric pressure; and pressure difference absorbing means connecting the high pressure evaporation vessel and the low pressure expansion vessel and having a predeterminate length along which there is gradually relieved the pressure difference between the pressure prevailing in the high pressure evaporation vessel and the pressure prevailing in the low pressure expansion vessel.

When carrying out the inventive method or in the inventive apparatus no surplus vapor is wasted; hence, energy is used very efficiently. Since the expansion from the high pressure stage to the low pressure stage is gradually effected over a considerable length and with the avoidance of any sudden relief or expansion at predetermined locations by means of valves etc., the corrosion attack on materials is considerably reduced and material may be used which are much less subject to corrosion.

It is advantageous, in order to prevent pressure venting from the high pressure evaporator or evaporation vessel into the atmospheric pressure region which exists e.g. in the flaker, to dispose, as a pressure difference absorbing means, a U-shaped sealing siphon tube and a low pressure expansion vessel operating at less than atmospheric pressure between the high pressure evaporator or evaporation vessel and the flaker. With this arrangement, the pressure difference between the high pressure evaporator or evaporation vessel and the low pressure expansion vessel is automatically maintained by the U-shaped sealing siphon tube or device.

According to a further, very advantageous embodiment of the inventive apparatus an intermediate vessel is disposed between the high pressure evaporator or evaporation vessel and the low pressure expansion vessel and connected with the low pressure expansion vessel by means of a recirculation pipe through which a part of the expanded, concentrated and cooled caustic alkali, for example, soda solution is recirculated and mixed with the solution present in the intermediate vessel.

BRIEF DESCRIPTION OF THE DRAWINGS

The invention will be better understood and objects other than those set forth above will become apparent when consideration is given to the following description thereof. Such description makes reference to the annexed drawings wherein throughout the various Figures of the drawings there have been generally used the same reference characters to denote the same or analogous components and wherein.

DETAILED DESCRIPTION OF THE PREFERRED EMBODIMENTS

Figure 1:
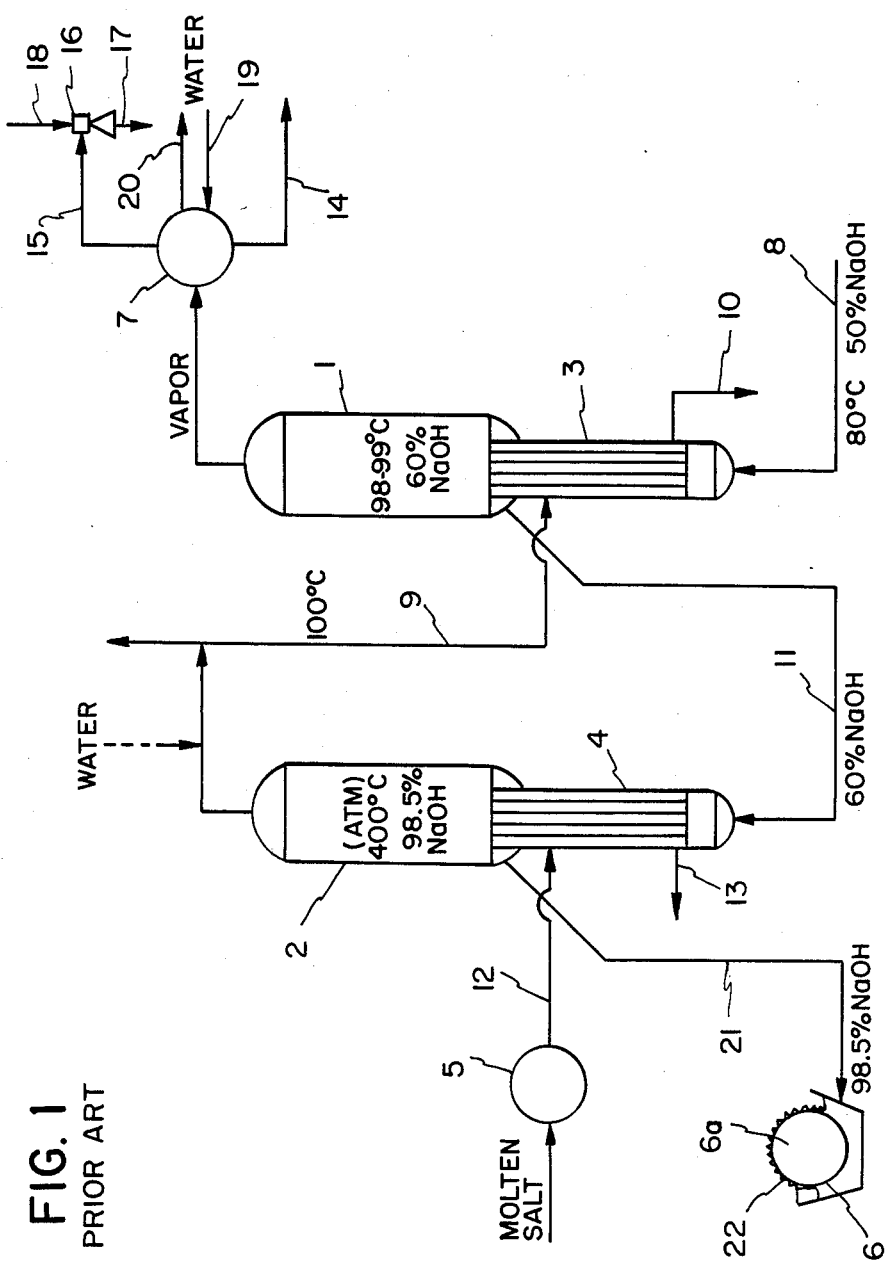
FIG. 1 is a block diagram of a prior art apparatus for producing high density or concentration caustic alkali.
Figure 2:
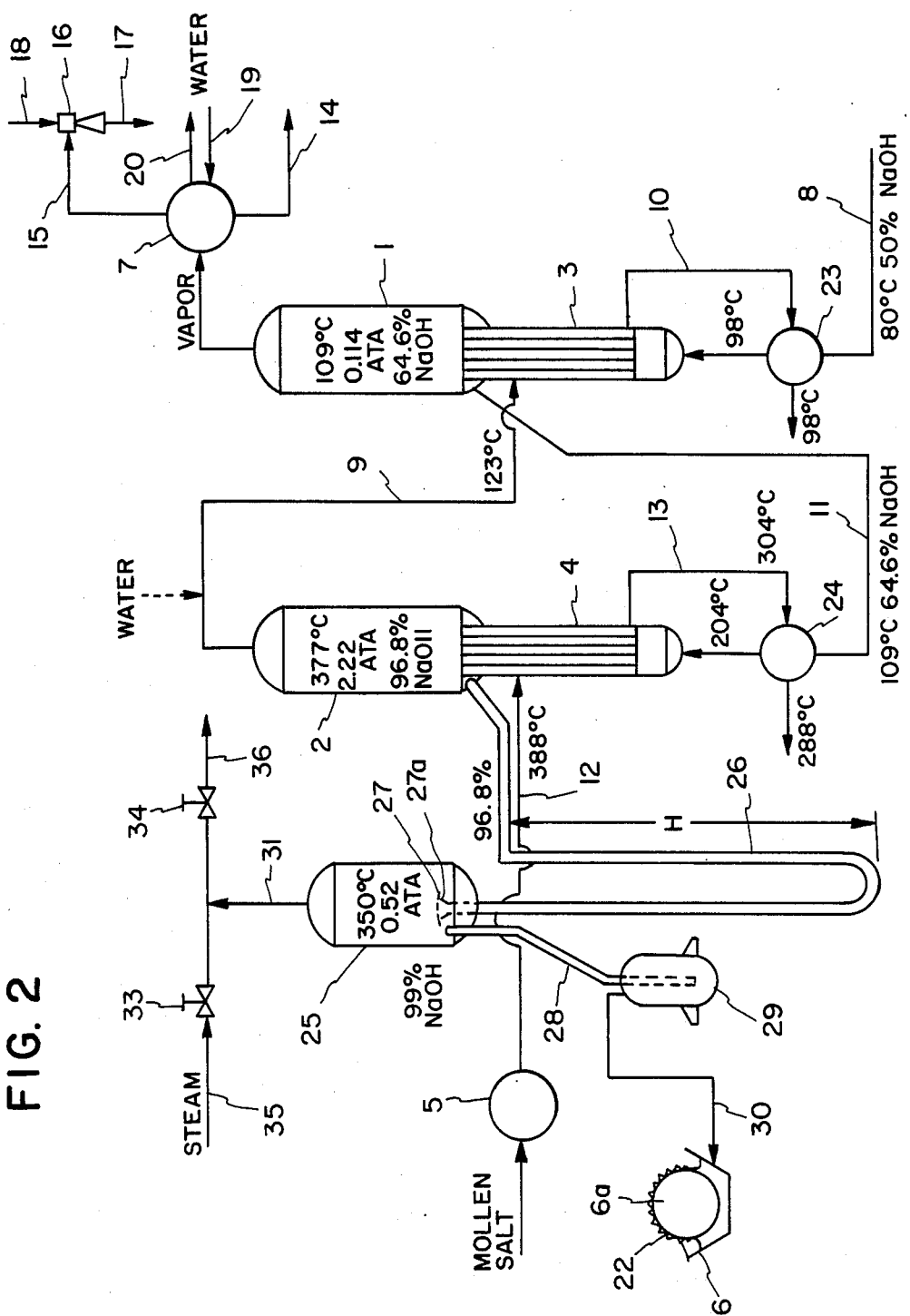
FIG. 2 is a block diagram showing a first exemplary embodiment of the inventive apparatus for producing high density or concentration caustic alkali.
Figure 3:
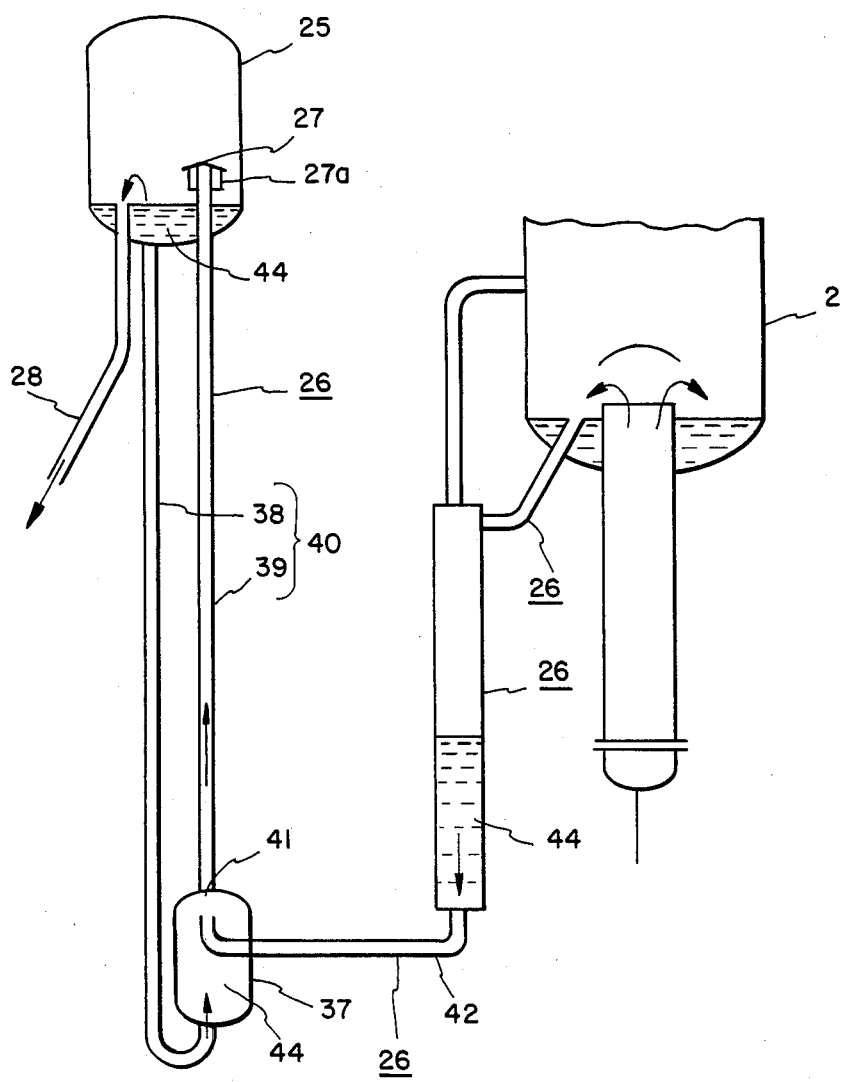
FIG. 3 is a schematic vertical sectional view of a part of a second exemplary embodiment of the inventive apparatus.

Describing now the drawings of FIGS. 2 and 3, it is to be understood that only enough of the construction of the apparatus has been shown as needed for those skilled in the art to readily understand the underlying principles and concepts of the present development, while simplifying the showing of the drawings. Turning attention now specifically to FIG. 2 of the attached drawings, there has been shown by example and not by limitation a block diagram of a first exemplary embodiment of the inventive apparatus for producing high density or concentration caustic alkali. In this block diagram, reference numerals 1 and 2 respectively designate evaporators or evaporation vessels of a preconcentration stage and a high pressure evaporation stage, reference numerals 3 and 4 denote heat exchangers constituted by a multiplicity of tubes or pipes and respectively connected to the bottom section of the evaporators or evaporation vessels 1 and 2, reference numeral 5 denotes a heat transfer medium heater, specifically a molten salt heater, reference numeral 6 denotes a flaker, reference numeral 7 denotes a condenser and its associated components, and reference numerals 8, 9, 11 and 12 denote connecting pipes, all of which aforementioned components constitute components of the type as already shown for the prior art apparatus in FIG. 1.

The presently described first exemplary embodiment of the inventive apparatus, however, differs in many aspects from the prior art apparatus illustrated in FIG. 1.

Firstly, a positive internal pressure in the range of about 1.61 to about 2.22 atmospheres or bar is maintained within the high pressure evaporator or evaporation vessel 2.

A saturation heat source or heat transfer medium of about 110° to about 123° C. is produced by adding water to the superheated vapor or steam which is generated at temperatures in the range of 372° to 377° C. in the high pressure evaporator or evaporation vessel 2, and the entirety of this heat source or heat transfer medium is supplied to the heat exchanger 3. Also, respective preheaters 23 and 24 are provided in the pipes 8 and 11 such that the caustic alkali, for example, soda solution flowing in the pipes 8 and 11 is preheated by the heat source or heat transfer medium which is respectively discharged from the heat exchangers 3 and 4 through the pipes 10 and 13. Furthermore, the pressure prevailing in the evaporator or evaporation vessel 1 is reduced to a level of about 0.114 bar so as to obtain a 64.6% caustic alkali, for example, soda solution at about 109° C. Under these conditions, a 96.8% caustic alkali, for example, soda solution is obtained in the high pressure evaporator or evaporation vessel 2.

With this arrangement, using a 123° C. heat source or heat transfer medium in the heat exchanger 3 and the pressure of about 0.114 bar in the evaporator or evaporation vessel 1, it is possible to remove the water up to a density of the caustic alkali, for example, soda solution in such evaporator 1 corresponding to a concentration of about 64.6% at a temperature of the caustic alkali, for example, soda solution, in this evaporator 1 of about 109° C. Consequently, a caustic alkali, for example, soda solution of higher density and temperature than the conventional arrangement can be introduced into the tubes or pipes of the heat exchanger 4 associated with the high pressure evaporator or evaporation vessel 2. The amount of heat source or heat transfer medium to be supplied to the heat exchanger 4 can be reduced by an amount corresponding to the reduction of the amount of water to be removed in this heat exchanger 4 so that the respective energy is saved. In the evaporator or evaporation vessel 2 in which the internal pressure is raised to the range of about 1.61 to about 2.22 bar, it is possible to obtain a 96.8% caustic alkali, for example, soda solution.

Since the interior of the high pressure evaporator 2 or evaporation vessel is pressurized, means is to be provided to reduce the pressure difference between the high pressure evaporator or evaporation vessel 2 and the cooled flaker 6.

To this end, and according to the first embodiment of the inventive apparatus, a low pressure expansion vessel 25 at a pressure less than atmospheric pressure, namely about 0.52 bar, is connected to the high pressure evaporator or evaporation vessel 2, such that an expansion flash takes place from the high pressure evaporator or evaporation vessel 2 and to the low pressure expansion vessel 25. The lower end region or bottom section of the high pressure evaporator or evaporation vessel 2, and the low pressure expansion vessel 25 are connected through a hairpin-shaped or U-shaped sealing siphon tube or pipe 26, to maintain a seal head H large enough to compensate for the pressure difference between the high pressure evaporator or evaporation vessel 2 and the low pressure expansion vessel 25. The height of this seal head H is about 10 m. It is possible to regulate automatically, by virtue of the U-shaped sealing siphon tube or pipe 26, the pressure difference of expansion prevailing between the high pressure evaporator or evaporation vessel 2 and the low pressure expansion vessel 25 when the internal pressure of the high pressure evaporator or evaporation vessel 2 changes. Since no abrupt pressure relief or expansion but only a smooth continuous relief or expansion takes place in this U-shaped sealing siphon tube or pipe 26, corrosion and erosion which are inevitable in the conventional devices is considerably suppressed.

One end of the U-shaped sealing siphon tube or pipe 26 projects to a small extent into the high pressure evaporator or evaporation vessel 2 in order to permit an overflow of the caustic alkali, for example, soda solution accumulated in the bottom section of the high pressure evaporator or evaporation vessel 2. The other end of the U-shaped sealing siphon tube or pipe 26 protrudes vertically upwardly into the low pressure expansion vessel 25. A deflector 27 is supported by a plurality of supports 27a above this other end of the U-shaped sealing siphon tube or pipe 26 such that the caustic alkali, for example, soda solution issuing from this other end of the U-shaped sealing siphon tube or pipe 26 collides with the deflector 27 and is deflected into the low pressure expansion vessel 25.

The caustic alkali, for example, soda solution in the high pressure evaporator or evaporation vessel 2 is at a higher pressure than atmospheric pressure and heated so as to assume a concentration of at least 96.8%. This heated caustic alkali, for example, soda solution is subjected to an adiabatic flash when entering the low pressure expansion vessel 25 through the U-shaped sealing siphon tube or pipe 26. Consequently, latent heat stored in such caustic alkali, for example, soda solution is utilized as a heat source for further concentration by flash evaporation, thus achieving a concentration of the caustic alkali, for example, soda solution up to 99%.

The thus obtained high density caustic alkali, for example, soda solution overflows the end of a pipe 28 which protrudes to a small extent through a bottom wall into the low pressure expansion vessel 25, into an intermediate vessel and flows into specifically a further intermediate vessel 29 from which the high density caustic alkali, for example, soda solution is supplied to the flaker 6 through a pipe 30 and therein is converted into a flake-like product.

In this first embodiment of the inventive apparatus, it is not necessary to pay specific attention to the reduction of the pressure difference between the high pressure evaporator or evaporation vessel 2 and the low pressure expansion vessel 25 due to a reduction in the pressure load because the difference between the levels of the liquid in the two tube sections or legs of the U-shaped sealing siphon tube or pipe 26 is automatically reduced when the pressure difference is reduced.

The caustic alkali, for example, soda solution in the U-shaped sealing siphon tube or pipe 26 is agitated when the pressure load fluctuations are too great. This problem may be solved by a baffle in the U-shaped sealing siphon tube or pipe 26 which stabilizes the liquid level. Such a baffle, however, will soon become useless due to rapid corrosion and erosion. In the presently described embodiment, therefore, the U-shaped sealing siphon tube or pipe 26 is constituted by a long U-shaped pipe having a height or seal head H or predeterminate length of about 10 m.

The pressure in the low pressure expansion vessel 25 should never be reduced below about 0.3 bar, whereby the caustic alkali, for example, soda solution would solidify. To eliminate this problem, according to the invention, vapor or steam pipes 35 and 36 extend from the pipe 31 which is connected to the upper end of the low pressure expansion vessel 25, and are provided with respective regulating valves 33 and 34 for regulating the inflow of make-up steam and/or the outflow of vapor or steam, as the case may be. If the internal pressure of the low pressure expansion vessel 25 falls abruptly, the regulating valve 33 is opened to compensate for the pressure drop by steam injection through the pipe 35 which thus constitutes a steam inflow pipe, and the regulating valve 34 is closed to reduce the discharge of vapor or steam through the pipe 36, which thus constitutes a vapor or steam outflow pipe. The abrupt pressure drop in the low pressure expansion vessel 25 as well as the thereby caused solidification of the caustic alkali, for example, soda solution are thereby prevented.

FIG. 3 shows a U-shaped sealing siphon tube or pipe 26 which constitutes an essential part of a second exemplary embodiment of the inventive apparatus. Other components are materially identical to those shown in FIG. 2.

Referring to FIG. 3, reference numeral 2 designates the high pressure evaporator or evaporation vessel upstream of the flash evaporation which takes place in the low pressure expansion vessel 25, reference numeral 26 denotes the U-shaped sealing siphon tube or pipe, reference numeral 27 denotes the deflector attached to one end of the U-shaped sealing siphon tube or pipe 26 through supports 27a within the low pressure expansion vessel 25, and reference numeral 28 denotes a pipe through which high density caustic alkali, for example, soda is discharged from the low pressure expansion vessel 25.

An intermediate vessel 37 is disposed in the lower region of a vertical leg 39 of the U-shaped sealing siphon tube or pipe 26 and which leg 39 extends to the low pressure expansion vessel 25. The upper end of this intermediate vessel 37 is connected to the lower end of the low pressure expansion vessel 25 through this vertical leg 39 which constitutes a rise-pipe to which the deflector 27 is attached. The lower end of this vertical leg or rise-pipe 39 opens into the top of the intermediate vessel 37 and defines an opening 41. The one end of a pipe 42 which issues from the high pressure evaporator or evaporation vessel 2, extends into the intermediate vessel 37 and is positioned such as to face the opening 41 of the vertical leg or rise-pipe 39 at a spacing from the opening 41, thus having the effect of a nozzle or injector.

The lower end of the intermediate vessel 37 is connected by means of a recirculation pipe 38 to a region of the low pressure expansion vessel 25 which region is different from the region where the vertical leg or rise-pipe 39 is connected. The recirculation pipe 38 and the vertical leg or rise-pipe 39 in combination constitute a hairpin-shaped or U-shaped siphon-type sealing structure 40.

In this siphon-type sealing structure 40, a space 44 between the recirculation pipe 38 and the vertical leg or rise-pipe 39 is always filled with caustic alkali, for example, soda solution so that a pressure head corresponding to the pressure difference between the high pressure evaporator or evaporation vessel 2 and the low pressure expansion vessel 25 is applied to the intermediate vessel 37 through the recirculation pipe 38. As a result, the pressure in the intermediate vessel 37 is maintained at a level equal to that before the expansion, e.g. the pressure level in the range of 1.61 to 2.22 bar which prevails in the high pressure evaporator or evaporation vessel 2. The vertical leg or rise-pipe 39 is structured to cause a pressure drop equal to the pressure drop of expansion, i.e. the pressure difference existing between the high pressure evaporator or evaporation vessel 2 (1.61 to 2.22 bar) and the low pressure expansion vessel 25 (0.52 bar). In the event that the pressure drop varies because of a varying pressure load, the opening 41 and the associated end of the pipe 42 within the intermediate vessel 37 operate in the manner of an injector and allow the vertical leg or rise-pipe 39 to suck or withdraw a corresponding amount of caustic alkali, for example, soda solution supplied by natural circulation through the recirculation pipe 38 so that the pressure difference is automatically controlled or regulated. Consequently, there is prevented a venting of vapor or steam from the high pressure evaporator or evaporation vessel 2 and thus stable or invariable evaporation is ensured.

It will be understood that any change in the pressure prevailing within the high pressure evaporator or evaporation vessel 2 causes a change in the liquid level of the caustic alkali, for example, soda solution present in the pipe 42.

If the siphon-type sealing structure 40, i.e. the recirculation pipe 38 and the intermediate vessel 37 equipped with the internal injector are omitted from the U-shaped sealing siphon tube or pipe 26, the pressure drop may or may not be balanced by the portion of the U-shaped sealing siphon tube or pipe 26 present in the low pressure expansion vessel 25 at the occurrence of a change in the pressure difference between the high pressure evaporator or evaporation vessel 2 and the low pressure expansion vessel 25. In the event that boiling occurs at one third of the height of the U-shaped sealing siphon tube or pipe 26 and which portion extends within the low pressure expansion vessel 25, or near the lower end of the pipe, the caustic alkali, for example, soda solution may be caused to jump. However, by providing the siphon-type sealing structure 40 and the intermediate vessel 37 having the internal injector as shown in FIG. 3, boiling can be confined to the vertical leg or rise-pipe 39 because the internal injector in the intermediate vessel 37 is maintained at a pressure in the range of 1.61 to 2.22 bar due to the pressure head effective at the intermediate vessel 37.

The present invention thus permits a caustic alkali, for example, soda solution, which has been concentrated under the action of pressure and heat, to be further concentrated by subjecting the same to flash evaporation at reduced pressure. In this manner the heat source can be very efficiently used for producing a high density caustic alkali, for example, soda solution.

Also, since the pressure difference between the high pressure evaporator or evaporation vessel 2 and the low pressure expansion vessel 25 is balanced because of the U-shaped sealing siphon tube or pipe 26, high pressure to low pressure flash evaporation can be reliably and safely effected.

It is noted that reliable operation is achieved regardless whether there occurs a pressure variation at the high pressure or at the low pressure end of the system or a change in the pressure difference. This beneficial effect is achieved by the self-balancing action upon the pressure difference which is provided by the U-shaped sealing siphon tube or pipe 26 in combination with the intermediate vessel 37 and its hairpin or U-shaped siphon-type sealing structure 40 with the internal injector. Additionally, steam may be injected into the low pressure expansion vessel 25.

While there are shown and described present preferred embodiments of the invention, it is to be distinctly understood that the invention is not limited thereto, but may be otherwise variously embodied and practiced within the scope of the following claims.

Accordingly, we claim:

1. A method of producing high-concentration of at least 94% caustic alkali by concentrating a caustic alkali solution by evaporation at an elevated temperature, comprising the steps of:

concentrating the caustic alkali solution by evaporating water from the caustic alkali solution at a pressure of about 1.61 to about 2.22 bar above atmospheric pressure in a high pressure evaporation stage;

expanding the thus obtained concentrated caustic alkali solution to a predetermined low pressure in a low pressure expansion stage;

absorbing the pressure difference existing between said high pressure evaporation stage and said low pressure expansion stage by means of a pressure difference absorber of predetermined length;

selecting as said pressure difference absorber of said predetermined length a liquid column disposed between said high pressure evaporation stage and said low pressure expansion stage; and maintaining a seal head to compensate for the pressure difference between the high pressure evaporation stage and the low pressure expansion stage.

2. The method as defined in claim 1, further including the step of:

selecting as said low pressure to which the concentrated caustic alkali solution is expanded in said low pressure expansion stage a pressure of about 0.52 bar but not below 0.3 bar.

3. The method as defined in claim 1, further including the step of:

recirculating a part of the expanded concentrated caustic alkali solution from said low pressure expansion stage through said pressure difference absorber to said low pressure expansion stage; and mixing during the recirculating step said part of the expanded concentrated caustic alkali solution with the concentrated caustic alkali solution produced from said high pressure evaporation stage.

4. The method as defined in claim 1, further including the steps of:

preconcentrating said caustic alkali solution prior to concentrating a thus obtained preconcentrated caustic alkali solution in said high pressure evaporation stage;

producing steam of a predetermined temperature and pressure during said step of concentrating said caustic alkali solution and evaporating water from said caustic alkali solution in said high pressure evaporation stage; and using the entirety of said steam produced in said high pressure evaporation stage for heating said caustic alkali solution during said step of preconcentrating said caustic alkali solution.

5. The method as defined in claim 1, wherein:

said step of expanding said concentrated caustic alkali solution to said predeterminate low pressure in said low pressure expansion stage comprises adiabatically expanding said concentrated caustic alkali solution.

* * * * *